No. 894,076. PATENTED JULY 21, 1908.
E. J. STEELE.
COMBINATION PLOW AND HARROW.
APPLICATION FILED OCT. 8, 1907.

Witnesses
A. H. Rabsaig
N. N. Butler

Inventor
E. J. Steele

By N. C. Evert & Co.
Attorneys

UNITED STATES PATENT OFFICE.

EPHRAIM J. STEELE, OF NORTH BRADDOCK, PENNSYLVANIA.

COMBINATION PLOW AND HARROW.

No. 894,076.      Specification of Letters Patent.      Patented July 21, 1908.

Application filed October 8, 1907. Serial No. 396,429.

*To all whom it may concern:*

Be it known that I, EPHRAIM J. STEELE, a citizen of the United States of America, residing at North Braddock, in the county of Allegheny and State of Pennsylvania, have invented certain new and useful Improvements in a Combination Plow and Harrow, of which the following is a specification, reference being had therein to the accompanying drawing.

This invention relates to a combined plow and harrow, and the invention has for its object the provision of positive and reliable means for adjusting a harrow while the plow is in operation.

Another object of this invention is to provide a harrow attachment for plows that can be easily and quickly manipulated to disintegrate the soil to any desired depth, the attachment being arranged to work the soil that has been thrown up by the plow, thus saving considerable time and labor that has heretofore been incurred when the plow and harrow were distinct implements.

With the above and other objects in view which will more readily appear as the invention is better understood, the same consists in the novel construction, combination, and arrangement of parts to be hereinafter more fully described and then specifically pointed out in the appended claims.

Figure 1:
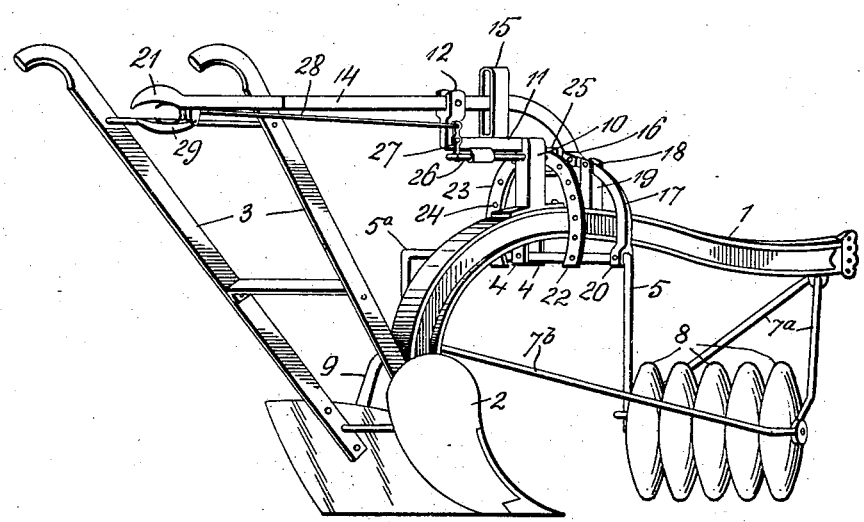
Figure 2:
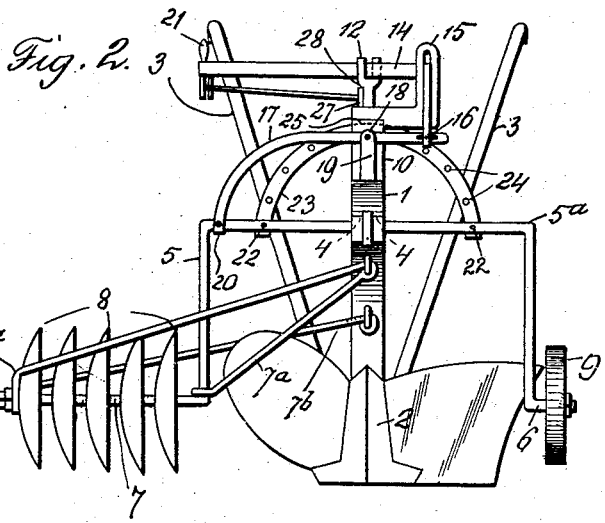

In the drawings:—Figure 1 is a perspective view of the combined plow and harrow, and Fig. 2 is a front elevation of the same.

In the accompanying drawings, 1 designates a plow beam having blades 2 and handles 3. The beam 1 is provided with depending lugs 4 and pivotally mounted between said lugs are two frames 5 and 5ª, said frames extending outwardly upon each side of the plow and bent downwardly and then outwardly to provide spindles 6 and 7. Upon the spindle 7 is journaled a plurality of concave disks 8, constituting the harrow of the implement. The ends of spindle 7 are connected to the front end of the beam 1 by rods 7ª and the rear end of said beam is connected to the outer end of the spindle 7 by a rod 7ᵇ, the rods 7ª and 7ᵇ stiffening the spindle and insuring a positive operation of the concave disks 8. Upon the spindle 6 is mounted a wheel 9 adapted to travel over the soil and assist in maintaining the equilibrium of the plow when in operation.

The beam 1 directly above the lugs 4 is provided with a standard 10 carrying a bracket 11, which is bifurcated as at 12 for a pivoted lever 14. This lever 14 extends through a slotted post 15, carried by the bracket 11 and is pivotally connected, as at 16, to an arm 17, said arm being fulcrumed, as at 18, in the post 19, carried by the beam 1. The arm 17 is pivotally connected, as at 20, to the harrow frame 5, and by raising and lowering the handle end 21 of the lever 14, the harrow frame 5 can be adjusted.

Rigidly secured to the harrow frame 5, and to the wheel frame 5ª as at 22, is a segment shaped arm 23 having a plurality of openings 24 formed therein. The segment shaped arm 23 extends through a strap 25 carried by the standard 10, and operating in said standard is a locking-bolt 26 for engaging in one of the openings 24 of the arm 23 and holding the harrow frame 5 and wheel frame 5ª in adjusted positions. The bolt 26 is connected to a pivoted lever 27, carried by the bracket 11, said pivoted lever being connected by a rod or link 28 to a spring pressed bell crank lever 29 carried by the handle end 21 of the lever 14. The bell crank lever 29, rod 28, lever 27 and bolt 26 constitute a locking mechanism, such as ordinarily used in connection with throttles and movable levers.

It is thought that the construction of my improved implement will be readily understood from the above description taken in connection with the drawings, and I reserve the right to make such alterations in the details of construction as are permissible by the appended claims.

Having now described my invention what I claim as new, is:—

1. The combination with a plow, of frames pivotally connected to the beams thereof, a plurality of disks rotatably-mounted upon one of said frames, a roller rotatably-mounted upon the other of said frames, a bracket carried by said plow, a lever pivotally mounted in said bracket, an arm pivotally carried by said plow and connecting with said lever and one of said frames, a pierced segment-shaped arm connecting with said frames, a locking-bolt arranged adjacent to said bracket for engaging said segment shaped arm, and a spring pressed bell crank lever carried by the first mentioned lever for moving said locking-bolt.

2. The combination of a plow, a harrow frame pivotally carried by the beam of said plow, a bracket carried by said plow, a lever fulcrumed in said bracket for moving said harrow frame, a segment-shaped arm connecting with said harrow-frame, and means arranged adjacent to said lever and engaging said segment shaped arm for holding said harrow frame in a fixed position.

3. An implement of the type described, comprising a plow, a harrow frame pivotally connected thereto, a lever carried by said plow for moving said harrow frame, a segment shaped arm connected to said harrow frame, and means arranged adjacent to said lever for locking said segment shaped arm in a fixed position.

In testimony whereof I affix my signature in the presence of two witnesses.

EPHRAIM J. STEELE.

Witnesses:
 MAX H. SROLOVITZ,
 A. J. TRIGG.